March 15, 1966 G. L. BOETTLER 3,240,432
APPARATUS FOR SPRAYING RESIN
Filed Feb. 18, 1964 2 Sheets-Sheet 1
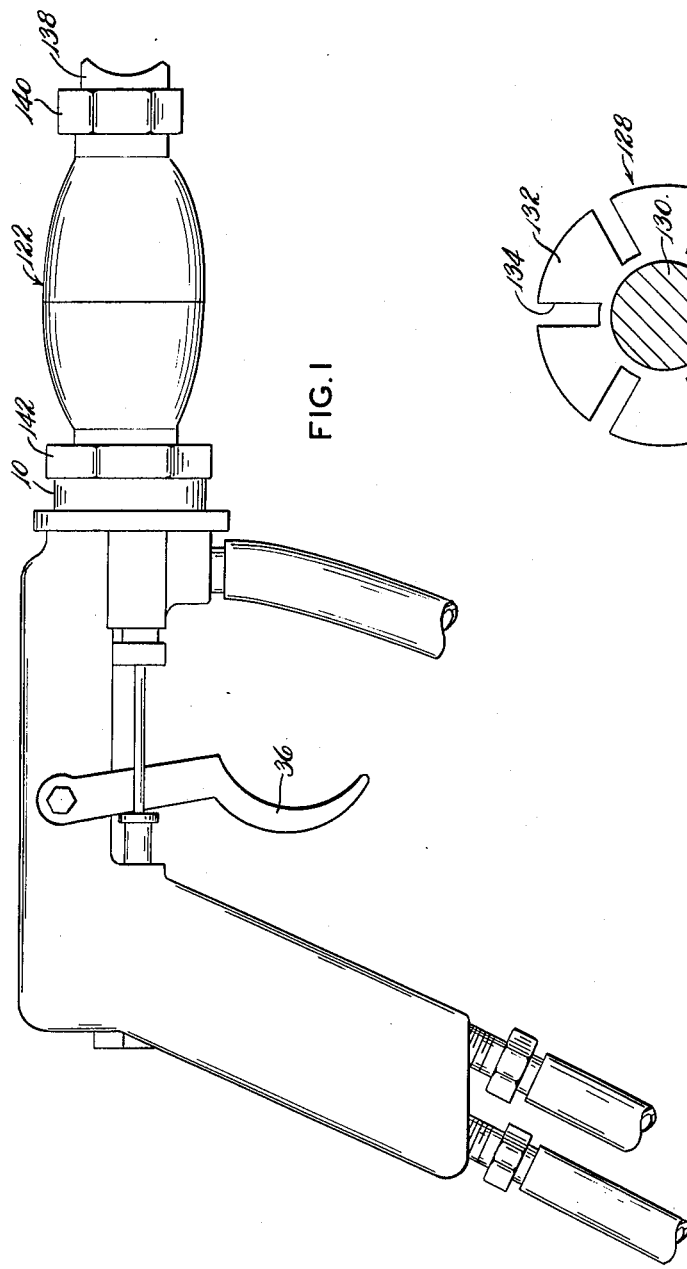
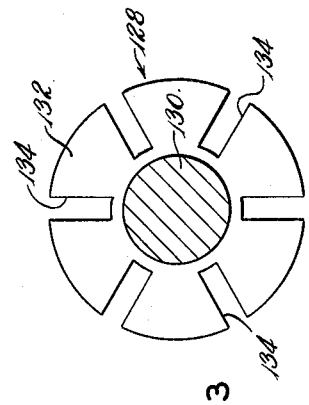
INVENTOR.
GERALD L. BOETTLER
BY
ATTYS

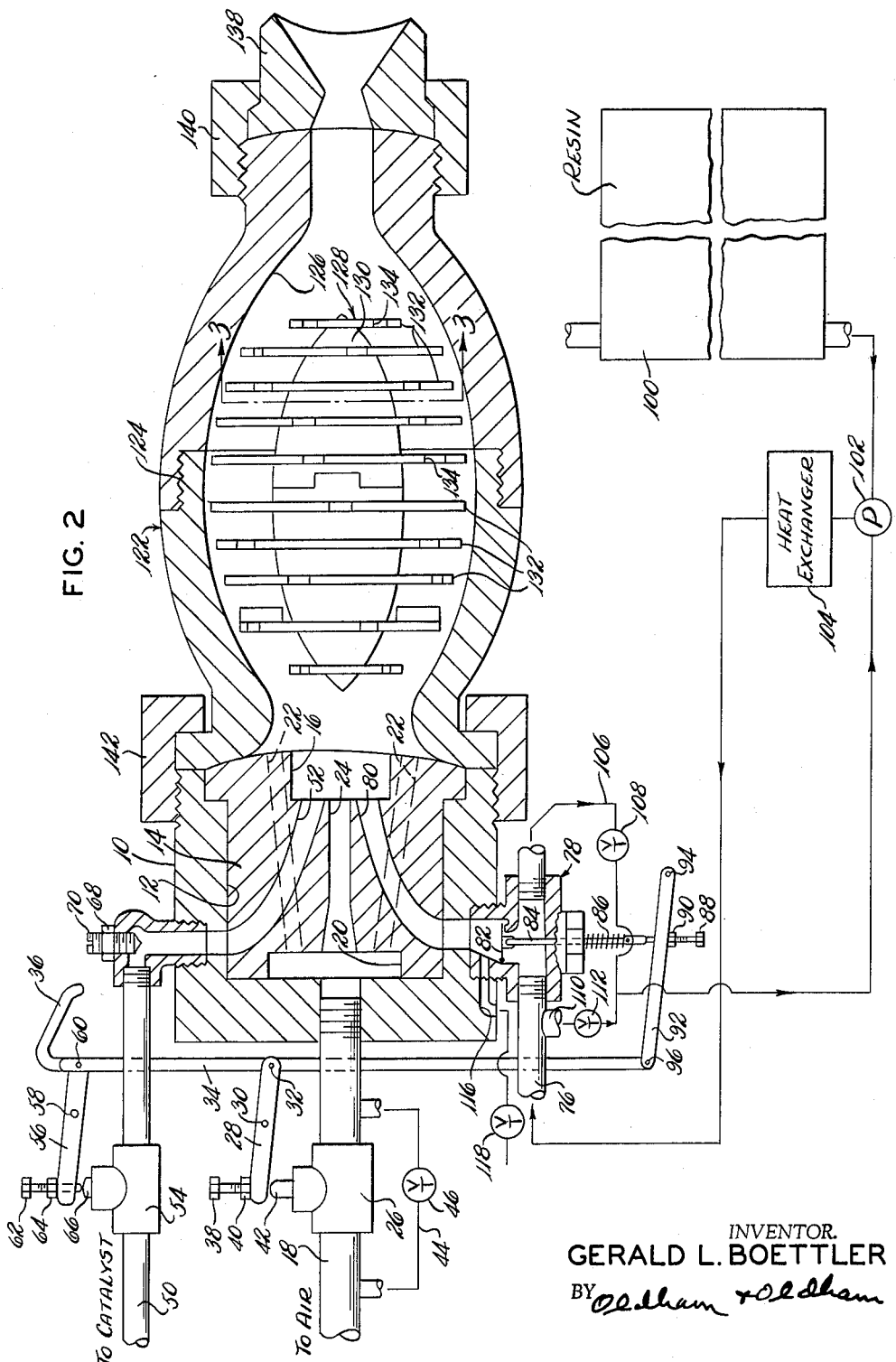

United States Patent Office 3,240,432
Patented Mar. 15, 1966

3,240,432
APPARATUS FOR SPRAYING RESIN
Gerald L. Boettler, 732 Akron Blvd., Kent, Ohio
Filed Feb. 18, 1964, Ser. No. 345,630
8 Claims. (Cl. 239—124)

This invention relates to apparatus for spraying resin, and, more particularly, is concerned with the spraying of an epoxy resin activated by a catalyst.

It has been proposed heretofore to spray an epoxy resin and an activating catalyst. See, for example, U.S. patent application Ser. No. 234,978, filed Nov. 2, 1962, now abandoned and entitled Method and Apparatus for Applying Marking Strips to Highways and the Like. However, in the spraying of a catalyst activated resin no conventional spraying guns or apparatus have been found satisfactory for several reasons. First, the spraying apparatus is very subject to plugging up and becoming inoperative, particularly if the spraying apparatus is used intermittently, as is the case in the usual spraying of a road marking strip. Additionally, adequate mixing of the resin and catalyst is usually not obtained in known equipment.

It is the general object of the present invention to avoid and overcome the foregoing and other difficulties of and objections to prior art apparatus by the provision of apparatus for spraying a catalyst activated resin, which apparatus is substantially free of plugging up even if the apparatus is operated intermittently, and in which the catalyst and resin are very thoroughly mixed before being sprayed.

Another object of the invention is to provide apparatus of the character described characterized by simplicity, low cost, and ease of maintenance.

Another object of the invention is to provide apparatus for spraying a resin and an activating catalyst wherein the resin is continuously circulated to and from a point adjacent the resin and catalyst mixing chamber, with resin being valved to the mixing chamber from the continuously circulated supply.

The foregoing objects of the invention and other objects which will become apparent as the description proceeds, are achieved by the provision of apparatus for spraying resin including means providing a mixing chamber, a resin tank, means for continuously circulating the resin past a point immediately adjacent the mixing chamber, valve means adjacent the mixing chamber for controlling the passage of the circulated resin to the mixing chamber, valve means controlling the passage of a catalyst to the mixing chamber, valve means controlling the passage of compressed air to the mixing chamber, means for simultaneously operating the valve means, means for continuously passing some compressed air to the mixing chamber, a secondary enlarged mixing chamber connected to the first mixing chamber to enhance the mixture of the resin and catalyst, and a discharge nozzle connected to the secondary mixing chamber.

For a better understanding of the invention, reference should be had to the accompanying drawings, wherein:

FIGURE 1 is a side elevation of a spray apparatus incorporating the principles of the invention;

FIGURE 2 is a diagrammatic view of the apparatus of FIGURE 1, including parts in longitudinal section; and FIGURE 3 is a cross-sectional view taken substantially on line 3—3 of FIGURE 2.

In the drawings, the numeral 10 indicates generally a housing formed with a cylindrical bore 12 removably receiving a plug 14 formed with a counterbore constituting a mixing chamber 16. Connected to the housing 10 is a conduit 18 supplying compressed air to a counterbore 20 in the plug 14, the counterbore 20 being connected by a plurality of passages 22 to the right or downstream side of the plug 14. There is also an axial passage 24 in the plug 14 connecting the counterbore 20 with the mixing chamber 16.

A control valve 26 is provided in the conduit 18, and this valve is adapted to be actuated by means of a finger 28 pivotally mounted at 30 and pivotally connected at 32 to a control rod 34 adapted to be operated by fluid pressure motor or by finger operated trigger 36. An adjusting cap screw 38 and lock nut 40 extend through the end of the finger 28 into engagement with the end of the valve stem 42 of the valve 26 so that the extent of the opening of the valve 26 upon the full or partial pulling of the trigger 36 can be controlled.

The conduit 18 is provided with a by-pass conduit 44 which extends around the valve 26 and which is provided with a throttle valve 46 so that even though the valve 26 is closed the throttle valve 46 can be adjusted to pass a controlled amount of air continuously to the counterbore 20 which functions to continuously clear all material out of the spraying apparatus when the trigger 36 is not pulled.

Catalyst is supplied by way of a conduit 50 to the housing 10 and through a curved passageway 52 in plug 14 to the mixing chamber 16. In the conduit 50 a control valve 54 is provided. The valve 54 is simultaneously actuated with the valve 26 by means of a finger 56 pivotally mounted at 58 and pivotally connected at 60 to the rod 34. An adjusting cap screw 62 and lock nut 64 extend through the end of the finger 56 to engage with the valve stem 66 of valve 54. Note that the cap screw 62 is normally adjusted so that the valve 54 does not open until after the valve 26 is actuated, and that valve 54 will close prior to the closing of valve 26 upon the actuation and release of the trigger 36. This action assists in clearing all catalysts from the spray apparatus between spraying operations.

The conduit 50 may include additional valve means 68 including an adjustable closure screw 70 so that a selected, proportionate, optimum amount of catalyst can pass to the spraying apparatus during the spraying operation Normally the valve 54 is placed as close as possible to the housing 10, and may even be built into the housing adjacent the curved passage 52, with valve 68 being incorporated and made a part of valve 54

Resin is adapted to be supplied to the mixing chamber 16 by means of a conduit 76 connected to a valve indicated as a whole by the numeral 78 and mounted on the housing 10 and connected to a curved passage 80 in plug 14 extending to the mixing chamber 16. The valve 78 is diagrammatically indicated to have a closure member 82 operable by and connected to a stem 84 normally moved by spring 86 to valve closure position. The end of the stem 84 is engaged by a cap screw 88 secured by a lock nut 90 and mounted on a finger 92 pivoted at 94 and pivotally connected at 96 to the rod 34.

Resin is supplied to the conduit 76 from a tank 100, a pump 102 being normally provided for pulling the resin from the tank and for passing it through a heat exhanger 104 to raise the temperature of the resin and to reduce its viscosity, with the heated resin passing from the heat exchanger 104 to the valve 78.

An important feature of the invention is to continuously circulate the resin and this is achieved by passing the resin through the valve 78 and then returning the resin by means of a return conduit 106 to the pump 102 for continuous recirculation through the heat exchanger 104. The pump 102 acts to continuously circulate the resin through the endless system described and only pulls additional resin from a tank 100 when resin is being passed from the valve 78 to the mixing chamber 16. A throttle valve 108 provided in the return conduit 106 controls the volume of the resin circulated.

Although it is preferable to circulate the resin completely through the valve 78 in the manner described, at least some of the advantages of the invention are achieved by providing a by-pass conduit 110 extending from the conduit 76 from a point immediately in front of the valve 78 and connected to the return conduit 106 through a throttle valve 112. By adjusting the relative openings of valves 108 and 112 the resin can be continuously circulated in one or the other of the two paths provided or can be circulated through a combination of these paths.

A passageway 116 may be provided in the housing, this being connected to atmosphere through a throttle valve 118 so that when the spraying apparatus is not operating it will be easier to pull the resin in the passage 80 out of this passage clear up to the valve 78 under the operation of the air being passed to the mixing chamber 16 by way of by-pass 44, to thereby insure that during any inaction of the spraying apparatus it will not become plugged with resin. However, usually the passage 116 and valve 118 are not required.

Connected to the mixing chamber 16 is a secondary mixing chamber indicated as a whole by the numeral 122, this secondary chamber being considerably larger than the mixing chamber 116. The secondary mixing chamber 122, usually made in two halves and screwed together at 124 has a streamlined shaped cavity 126 which removably receives a baffle means indicated as a whole by the numeral 128. The baffle means 128 includes a cigar-shaped body 130 having smoothly curved and pointed ends, the body having a series of circular baffle-like fins 132 formed with slots 134 positioned in staggered relation on the several baffles whereby the mixture of resin and catalyst passed from the mixing chamber 16 must flow through the rather tortuous path provided to thereby effect a very thorough mixing of the catalyst and resin. This noteably improves the polymerization of the resin.

The downstream or right hand end of the secondary mixing chamber 122 removably mounts a discharge nozzle 138 by means of a nut 140 threaded on the end of the secondary mixing chamber 122. The secondary mixing chamber is itself removably secured by means of a nut 142 to the threaded end of the housing 10.

It is believed that the operation of the apparatus will be understood from the foregoing description. It might be noted that the cap screw 88 is adjusted so that the valve 78 is not opened until after the air control valve 26 is opened, and with valve 78 shutting upon release of the trigger 36 prior to the closing of the air valve 26, this assisting in the cleaning out of the resin and catalyst from the spraying apparatus during any lulls in the operation of the apparatus. Thus, the apparatus can be used intermittently without clogging. This action is enhanced, and clogging is substantially eliminated by effecting the circulation of the resin continuously to and from the valve 78 placed closely adjacent to the mixing chamber 16.

While a certain representative embodiment and details have been shown for the purpose of illustrating the invention, it will be apparent to those skilled in this art that various changes and modifications may be made therein without departing from the spirit or scope of the invention.

What is claimed is:

1. Apparatus for spraying resin including a gun-shaped body having a substantially cylindrical housing, a plug removably received in the housing and having a counterbore comprising a mixing chamber, a first conduit carrying compressed air and connected axially of the housing, said plug having an axial hole connecting the first conduit with the mixing chamber, a control valve in the conduit, a trigger on the body controlling the opening of the valve, a second conduit carrying a catalyst and connected to the side of the housing, said plug having a passage connecting the second conduit with the mixing chamber, a second control valve and positioned in said second conduit, means connecting said trigger to control the opening of the second valve, a resin tank, a third conduit and connecting the resin tank to the side of the housing, said plug having a passage connecting the third conduit with the mixing chamber, a third control valve and positioned directly adjacent the housing in the third conduit, means connecting the trigger to control the opening in the third valve, a heat exchanger in the third conduit for heating the resin passing therethrough, a pump in the third conduit between the heat exchanger and the tank, a return conduit from the third control valve to the pump, a by-pass conduit from the third conduit in front of the third control valve to the return conduit, a throttle valve in each of the by-pass conduit and the return conduit, adjustable means in the trigger and the trigger connecting means whereby each control valve can be operated a selected relative amount upon pulling the trigger, an enlarged mixing chamber removably secured to the end of the housing adjacent the mixing chamber, baffle means in the enlarged mixing chamber for insuring the complete mixing of catalyst and resin passed therethrough, and a discharge nozzle removably secured to the discharge end of the enlarged mixing chamber.

2. Apparatus for spraying resin including a body having a substantially cylindrical housing, a plug removably received in the housing and having a counterbore comprising a mixing chamber, a first conduit carrying compressed air and connected to the housing, said plug having a hole connecting the first conduit with the mixing chamber, a control valve in the conduit, means on the body controlling the opening of the valve, a second conduit carrying a catalyst and connected to the side of the housing, said plug having a passage connecting the second conduit with the mixing chamber, a second control valve and positioned in said second conduit, means to control the opening of the second valve, a resin tank, a third conduit and connecting the resin tank to the side of the housing, said plug having a passage connecting the third conduit with the mixing chamber, a third control valve and positioned directly adjacent the housing in the third conduit, means to control the opening in the third valve, a heat exchanger in the third conduit for heating the resin passing therethrough, a pump in the third conduit between the heat exchanger and the tank, a return conduit from the third control valve to the pump, a by-pass conduit from the third conduit in front of the third control valve to the return conduit, a throttle valve in each of the by-pass conduit and the return conduit, adjustable means whereby each control valve can be operated a selected relative amount upon operating the valve control means, an enlarged mixing chamber removably secured to the end of the housing adjacent the mixing chamber, baffle means in the enlarged mixing chamber for insuring the complete mixing of catalyst and resin passed therethrough, and a discharge nozzle removably secured to the discharge end of the enlarged mixing chamber.

3. Apparatus for spraying resin including a body having a substantially cylindrical housing, a plug removably received in the housing and having a counterbore comprising a mixing chamber, a first conduit carrying compressed air and connected to the housing, said plug having a hole connecting the first conduit with the mixing chamber, a control valve in the conduit, means on the body controlling the opening of the valve, a second conduit carrying a catalyst and connected to the side of the housing, said plug having a passage connecting the second conduit with the mixing chamber, a second control valve and positioned in said second conduit, means to control the opening of the second valve, a resin tank, a third conduit and connecting the resin tank to the side of the housing, said plug having a passage connecting the third conduit with the mixing chamber, a third control valve and positioned directly adjacent the housing in the third conduit, means to control the opening in the third valve, a return conduit from the third control valve to the resin tank, adjustable means whereby each control valve can be operated a selected relative amount upon operating the valve control means, an enlarged mixing chamber removably secured to the end of the housing adjacent the mixing chamber, baffle means in the enlarged mixing chamber for insuring the complete mixing of catalyst and resin passed therethrough, and a discharge nozzle removably secured to the discharge end of the enlarged mixing chamber.

4. Apparatus for spraying resin including a body having a substantially cylindrical housing, a plug removably received in the housing and having a counterbore comprising a mixing chamber, a first conduit carrying compressed air and connected to the housing, said plug having a hole connecting the first conduit with the mixing chamber, a control valve in the conduit, means on the body controlling the opening of the valve, a second conduit carrying a catalyst and connected to the side of the housing, said plug having a passage connecting the second conduit with the mixing chamber, a second control valve and positioned in said second conduit, means to control the opening of the second valve, a resin tank, a third conduit and connecting the resin tank to the side of the housing, said plug having a passage connecting the third conduit with the mixing chamber, a third control valve and positioned directly adjacent the housing in the third conduit, means to control the opening in the third valve, a return conduit from the third control valve to the resin tank, adjustable means whereby each control valve can be operated a selected relative amount upon operating the valve control means, and a discharge nozzle removably secured to the discharge end of the mixing chamber.

5. Apparatus for spraying resin including a body having a housing, a plug in the housing and having a mixing chamber, a first conduit for carrying compressed air and connected to the housing, said plug having a hole connecting the first conduit with the mixing chamber, a control valve in the conduit, means on the body controlling the opening of the valve, a second conduit for carrying a catalyst and connected to the housing, said plug having a passage connecting the second conduit with the mixing chamber, a second control valve and positioned in said second conduit, means to control the opening of the second valve, a third conduit for connecting a source of resin from a tank to the housing, said plug having a passage connecting the third conduit with the mixing chamber, a third control valve and positioned directly adjacent the housing in the third conduit, means to control the opening in the third valve, a return conduit from the third control valve for connection to the resin tank, adjustable means whereby each control valve can be operated a selected relative amount upon operating the valve control means, and a discharge nozzle secured to the discharge end of the mixing chamber.

6. Apparatus for spraying resin including a body having a housing with a mixing chamber having an inlet end, a first passage for carrying compressed air to the mixing chamber and opening to said end, a control valve in the passage, means on the body controlling the opening of the valve, a second passage for carrying a catalyst to the mixing chamber and opening to said end of the mixing chamber and at one side of the air opening, a second control valve and positioned in said second passage, means to control the opening of the second valve, a third passage for carrying resin from a source to the mixing chamber and opening to said end of the mixing chamber and at the side of the air opening opposite from the catalyst opening, a third control valve and positioned directly adjacent the housing in the third passage, means to control the opening in the third valve, a return conduit from the third control valve for connection to the resin source, a discharge nozzle secured to the discharge end of the mixing chamber opposite said inlet end, and means for supplying air through the air opening even with the valves closed for cleaning of the adjacent catalyst and resin openings to the mixing chamber.

7. Apparatus for spraying resin including means providing a mixing chamber, means for continuously circulating a fluid resin past a point immediately adjacent the mixing chamber, valve means adjacent the mixing chamber for controlling the passage of the circulated resin to the mixing chamber, valve means controlling the passage of a catalyst to the mixing chamber, valve means controlling the passage of compressed air to the mixing chamber, means for simultaneously operating the valve means, means for continuously passing some compressed air to the mixing chamber even with said valves closed, and a discharge nozzle connected to the mixing chamber.

8. Apparatus for spraying resin including means providing a mixing chamber, means for delivering a fluid resin to an inlet end of the mixing chamber, valve means for controlling the passage of the resin to the mixing chamber, means for delivering a fluid catalyst to said inlet end of the mixing chamber, valve means controlling the passage of the catalyst to the mixing chamber, passage means for delivering compressed air to the inlet end of the mixing chamber adjacent the delivery locations of said resin and catalyst, valve means controlling the passage of the compressed air to the mixing chamber, means for simultaneously operating the valve means, and means for continuously supplying some compressed air to said passage means even with the valve means all closed whereby the air cleans off the resin and catalyst from the inlet end of the mixing chamber.

References Cited by the Examiner

UNITED STATES PATENTS

| 2,754,228 | 7/1956 | Bede | 239—124 |
| 2,991,015 | 7/1961 | Standlick | 239—127 |
| 3,035,775 | 5/1962 | Edwards et al. | 239—142 |
| 3,083,913 | 4/1963 | Coffman et al. | 239—142 |
| 3,132,808 | 5/1964 | Ott | 239—142 |
| 3,146,950 | 9/1964 | Lancaster | 239—415 |
| 3,157,361 | 11/1964 | Heard | 239—415 |

M. HENSON WOOD, Jr., *Primary Examiner.*

EVERETT W. KIRBY, *Examiner.*